United States Patent [19]

Lumbroso

[11] 4,320,383
[45] Mar. 16, 1982

[54] FAULT DETECTOR FOR VEHICLE BRAKE LIGHTS

[75] Inventor: Sylvain J. Lumbroso, Colombes, France

[73] Assignee: Jaeger, France

[21] Appl. No.: 129,572

[22] Filed: Mar. 12, 1980

[30] Foreign Application Priority Data

Mar. 19, 1979 [FR] France .................. 79 06838

[51] Int. Cl.³ .............. B60Q 11/00; G08B 23/00
[52] U.S. Cl. ........................... 340/71; 340/641
[58] Field of Search ............ 340/71, 79, 80, 641, 340/642; 315/77

[56] References Cited
U.S. PATENT DOCUMENTS 3,355,601 11/1967 Klein ..................... 340/642
3,631,393 12/1971 Bennett ................... 340/642
3,964,040 6/1976 Behl ..................... 340/641

FOREIGN PATENT DOCUMENTS 2730092 11/1979 Fed. Rep. of Germany ...... 340/641

Primary Examiner—Donald J. Yusko
Attorney, Agent, or Firm—Thomas J. Greer, Jr.

[57] ABSTRACT

The invention relates to a fault detector for light bulbs. It comprises an inductance connected in series between the bulb and a control switch, the arrangement being supplied with direct current. An alarm device, connected to the junction point between the bulb and inductance, is polarized in order to trip the alarm when the control switch is closed unless prevented from so doing by a tripping control circuit. The tripping control circuit responds to current flowing to the bulb subsequent to the closure of the control switch to prevent the actuation of the alarm device throughout the period of closure of the control switch.

9 Claims, 2 Drawing Figures

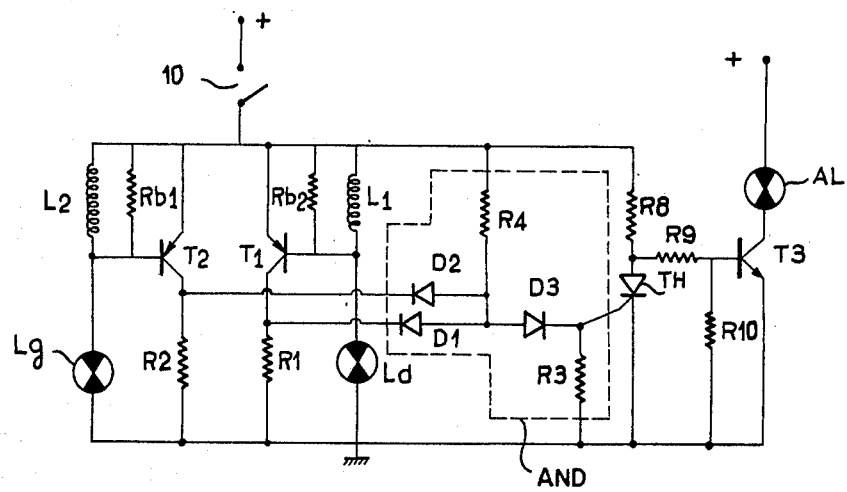
FIG_1
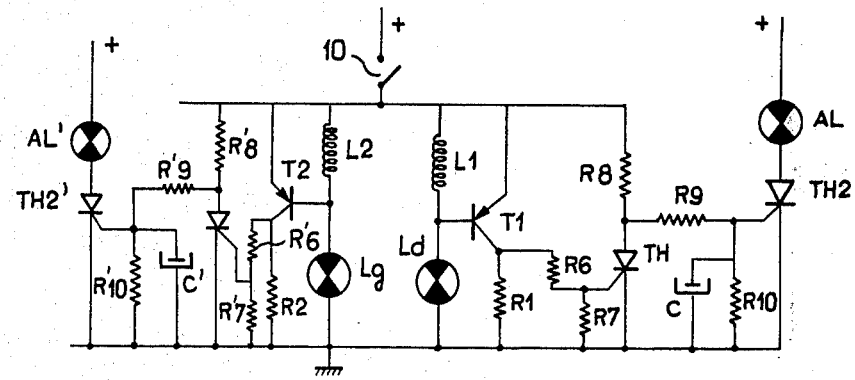
FIG_2

FAULT DETECTOR FOR VEHICLE BRAKE LIGHTS

The present invention relates to a fault detector for detecting faulty bulbs, in particular vehicle brake light bulbs which light up at the rear of a vehicle as soon as the vehicle brake pedal is depressed.

It is not possible for the driver himself to observe the state of the brake lights easily, since they light up only when the driver depresses the brake pedal.

It is important however to be aware of the condition of the brake lights and devices have already been proposed which make it possible to make drivers aware of a defect in one of the brake lights.

It is an object of the present invention to provide a detector for faults in vehicle brake lights, which is simpler than previous detectors and which fulfils the particular conditions imposed by the operating conditions on a vehicle.

In particular, the detector should not consume excessive current in comparison with the current which is consumed by the bulbs of the brake lights themselves, nor result in an excessive voltage drop between the bulbs to be illuminated and the battery supplying power, in order that the presence of the detector does not disturb the operation of these bulbs. In addition, although the detector is primarily intended to give warning of a faulty bulb which has gone open circuit, it should not be under load in the case of a faulty bulb short-circuiting the supply prior to the fuse associated with the bulb blowing.

According to the present invention there is provided a fault detector, in particular for at least one vehicle brake light bulb, comprising an inductance connected in series between the light bulb and a control switch, a direct current supply, an alarm device, and a circuit for controlling the tripping of the alarm device, the tripping control circuit having an input connected to a junction point between the bulb and the inductance and an output connected to the alarm device, characterised in that the tripping control circuit is responsive to current flowing to the bulb subsequent to the closure of the control switch to prevent the tripping of the alarm device throughout the period of closure of the control switch, the alarm device being polarised so as to be tripped by closure of the control switch unless tripping is prevented by the tripping control circuit.

The tripping control circuit may comprise means for detecting the flow of current to the said at least one light bulb and means for memorising the detection of current flow throughout the period of closure of the control switch.

In a preferred embodiment, the memorising means comprise a thyristor which is connected in parallel with end terminals of the inductance/bulb circuit, the gate of the thyristor being controlled by the detection means.

Very advantageously, the alarm device comprises an indicator mounted on the vehicle dashboard and connected in series with a switching member which is normally polarized so as to be conductive by a group of series resistors connected together in parallel with the end terminals of the inductance/bulb circuit, the thyristor being connected in parallel with at least one of the resistors in order to prevent the conduction of the switching member when the thyristor itself is conducting.

According to another feature of the invention, the switching member has a memory function. For example, the switching member may be a thyristor.

In a first construction for several bulbs, there are as many tripping control circuits and alarm devices as there are light bulbs.

In another construction for several bulbs, the tripping control circuit responds to the flow of current in the bulbs subsequent to the closure of the control switch to prevent the actuation of the alarm device throughout the period of closure of the control switch.

In this second case, the detection means advantageously comprise an AND function circuit, whereof the inputs are respectively connected to the common points between each of the bulbs and the associated inductance.

Embodiments of the invention will now be described, by way of example, with reference to the accompanying drawings, in which:

FIG. 1 shows a first embodiment of the invention; and

FIG. 2 shows a second embodiment of the invention.

The circuit illustrated in FIG. 1 comprises a brake pedal contactor designated by the reference numeral 10, the conventional function of this contactor being to allow the flow of current to the right and left-hand brake lights Ld and Lg (right-hand bulb Ld and left-hand bulb Lg), when the driver depresses the brake pedal.

One of the terminals of the contactor is connected to a source of d.c. current which is preferably the battery of the vehicle. The other terminal of the contactor is connected to the bulbs Ld and Lg in the following manner: each brake light is connected in series with an inductance of low value, L1 in series with Ld and L2 in series with Lg (and so on for other arrangements of brake lights and inductances, if there are more than two).

The arrangements in series constituted in this way are grouped in parallel and connected between the contactor 10 and the earth.

The inductances L1 and L2 have a very low d.c. resistance so that they produce a small voltage drop and a small energy loss not substantially affecting the supply of power to the bulbs Ld and Lg with which they are in series.

The junction point between the inductance L1 and the bulb Ld is connected to the base of a transistor T1, whereas the junction point between the inductance L2 and the bulb Lg is connected to the base of a transistor T2.

In this embodiment, the transistors T1 and T2 are PNP transistors, their emitters being connected to the contactor 10 and their collection being connected through the intermediary of resistors (respectively R1 and R2) to earth. The transistors are connected in a common emitter configuration with their respective inductances connected between their bases and emitters.

In the circuit for controlling the tripping the alarm, the transistors T1 and T2 form pre-amplifiers which are part of the detection means.

More precisely, at the time of braking, the switch 10 for controlling the lights closes, thus supplying power to the bulbs Lg and Ld. A considerable current flows to each bulb, and thus a considerable voltage (termed a voltage of self induction) is induced at the terminals of the inductances L1 and L2, especially since the filaments of the bulbs are generally cold and have a very low resistance.

If the filament of one of the bulbs is short-circuited, current continues to flow. On the contrary, if the filament of one of the bulbs is broken, there is no current flow.

The pulses resulting from the flow of current to the bulbs Lg and Ld, at the terminals of the inductances L1 and L2 respectively, are thus amplified by the transistors T1 and T2. Resistors Rb1 and Rb2 respectively connected in parallel with the inductances L1 and L2 if necessary reduce these pulses, thus constituting a load for the inductances.

In FIG. 1, the detection means are completed by an AND function circuit, constituted simply by three diodes D1, D2 and D3 having their anodes connected at a common point. Diodes D1 and D2 constitute the inputs of the AND logic circuit and are each connected to the collector of a respective transistor T1, T2. Diode D3 constitutes the output of the logic circuit, its cathode being connected to earth by a resistor R3. The common point of the diodes is connected, by a resistor R4, to the brake pedal contactor 10.

If one of the transistors T1 and T2 does not receive a pulse indicating the flow of current to the associated bulb, the common point of the diodes remains at earth potential.

The circuit for controlling the tripping of the alarm is completed by a thyristor TH, the anode of which is connected by a resistor R8 to the switch 10, the cathode of which is connected to earth, and the gate of which is connected to the output of the AND circuit (cathode of the diode D3). The thyristor is rendered conductive if two bulb current pulses are produced and remains so until the opening of the switch 10, thus ensuring a memory function. If one inflowing current pulse is missing, the cathode of the diode D3 remains at earth potential and the thyristor TH is not conducting.

In FIG. 1, the alarm device comprises a transistor T3, whereof the base is biased by the common point of two resistors R9 and R10 connected together in parallel with the thyristor TH. The emitter of the transistor T3 is connected to earth and its collector leads to an alarm indicator AL also connected to the + pole of the power supply.

The resistors R9 and R10 are chosen so that disregarding the thyristor TH, the transistor T3 conducts as soon as the switch 10 is closed. It will be seen immediately that under normal circumstances, the thyristor will short-circuit the resistors R9 and R10 and thus prevent the conduction of the transistor T3 as long as the switch 10 is closed. On the contrary, if one of the filaments of the bulb is broken, the thyristor TH remains blocked and the transistor T3 conducts to light up the indicator AL throughout the period of closure of the switch 10.

FIG. 2 illustrates a slightly different embodiment with an alarm indicator AL, AL' for each of the two light bulbs Lg, Ld respectively. In parallel with the collector resistor R1 of the transistor T1 is a resistive potential divider R6, R7 which controls the thyristor TH which in turn controls the indicator AL. Since a single bulb is involved, there is no need for an AND circuit.

One possible variation of the invention illustrated in FIG. 2 and which is generally applicable should be noted. The member for controlling the indicator AL is in this case another thyristor TH2, in turn controlled by its trigger. A capacitor C is connected in in parallel with the resistor R10 in order to form a time constant which ensures that the thyristor TH2 cannot be tripped before the thyristor TH when the contact 10 closes.

This use of a thyristor TH2 gives the alarm device a memory function as the thyristor remains conductive even after opening of the switch 10. The alarm may be cancelled if desired by a contact (not shown) on the dashboard which when actuated short-circuits the thyristor TH2.

The left-hand part of FIG. 2 relates to an identical arrangement, relating to the bulb Lg and parts of which are similar to those already described have the same reference numeral with a "'" thereafter.

Generally it will be noted that the indicators AL (and AL') consume current solely when the alarm is tripped. The remainder of the circuit is supplied with power solely at the time of braking, the contact 10 being closed. This results in an overall low consumption for the entire device.

What is claimed is:

1. A fault detecting light bulb switching circuit connectible to a DC supply source, including:
    (a) an inductance in series arrangement with the filament of the light bulb;
    (b) a light control switch connecting said series arrangement across said DC supply source;
    (c) said inductance developing normally, when said filament is unbroken, a transitory voltage of self induction thereacross upon closure of the light control switch;
    (d) an alarm device having a switching circuit coupled across said series arrangement and being biased to turn on the alarm device by said DC supply source upon closure of the light control switch;
    (e) an alarm control circuit arranged across said series arrangement and having an input responsive to said voltage of self induction across said inductance upon closure of the light control switch for preventing said switching circuit to turn on said alarm device throughout the period of closure of the control switch.

2. A circuit according to claim 1, wherein the alarm control circuit includes means for detecting said voltage of self induction and means capable of retaining the detection of said higher voltage throughout the period of closure of the light control switch.

3. A circuit according to claim 11, wherein the means for detecting said voltage of self induction includes a transistor having its emitter-base path connected across said inductance and its collector connected through a resistance to the light bulb filament terminal opposite to said inductance, the resistance of said inductance being such that only said transitory voltage of self induction, upon closure of the light control switch, will turn said transistor into conducting condition.

4. A circuit according to claim 3, wherein the retaining means comprises a thyristor having its gate electrode coupled to the collector electrode of said transistor.

5. A circuit according to claim 3, wherein said coupling of the alarm switching circuit across said series arrangement of the inductance and the light bulb filament comprises a voltage divider resistor arrangement connected across said series arrangement, the alarm switching circuit being connected across a portion of said voltage divider resistor arrangement, said thyristor coupled to short circuit said portion of said voltage divider resistor arrangement when retaining the detection of said voltage of self induction.

6. A circuit according to claim 5, wherein the alarm switching circuit includes a transistor.

7. A circuit according to claim 5, wherein the alarm switching circuit includes a thyristor.

8. A circuit according to claim 1, including:
(a) another inductance in series arrangement with the filament of another light bulb,
(b) the light control switch connecting both said series arrangements across said DC supply source,
(c) another alarm device having another switching circuit coupled across said another series arrangement for being biased to turn on the alarm device by said DC supply source upon closure of the light control switch,
(d) another alarm control circuit coupled across said another inductance means and responsive to higher voltage thereacross upon closure of the light control switch for preventing said another switching circuit to turn on said another alarm device throughout the period of closure of the control switch.

9. A circuit according to claim 2, including:
(a) another inductance in series arrangement with another light bulb filament,
(b) the light control switch connecting both said series arrangements across said DC supply source, and wherein said alarm control circuit includes another means for detecting a voltage of self induction coupled across said another inductance means;
(c) said retaining means being responsive only to detection by both said means for detecting a voltage of self-induction.

* * * * *

UNITED STATES PATENT AND TRADEMARK OFFICE
CERTIFICATE OF CORRECTION

PATENT NO. : 4,320,383
DATED : March 16, 1982
INVENTOR(S) : SYLVAIN J. LUMBROSO

It is certified that error appears in the above—identified patent and that said Letters Patent is hereby corrected as shown below:

Claim 3, column 4, line 48, "claim 11" should read
-- claim 2 --.

Signed and Sealed this

Eighteenth Day of May 1982

[SEAL]

Attest:

Attesting Officer

GERALD J. MOSSINGHOFF
Commissioner of Patents and Trademarks